United States Patent
Inagaki

(10) Patent No.: US 8,644,996 B2
(45) Date of Patent: Feb. 4, 2014

(54) POSITIONER

(75) Inventor: Yohsuke Inagaki, Tokyo (JP)

(73) Assignee: Azbil Corporation, Tokyo (JP)

( * ) Notice: Subject to any disclaimer, the term of this patent is extended or adjusted under 35 U.S.C. 154(b) by 288 days.

(21) Appl. No.: 13/053,484

(22) Filed: Mar. 22, 2011

(65) Prior Publication Data

US 2011/0245982 A1    Oct. 6, 2011

(30) Foreign Application Priority Data

Mar. 30, 2010  (JP) ................................. 2010-079365

(51) Int. Cl.
| | | |
|---|---|---|
| G05D 3/12 | (2006.01) | |
| G05D 5/00 | (2006.01) | |
| G05D 23/00 | (2006.01) | |
| G05D 11/00 | (2006.01) | |
| G05D 9/00 | (2006.01) | |
| F15B 5/00 | (2006.01) | |
| F16K 17/26 | (2006.01) | |
| F16K 31/12 | (2006.01) | |

(52) U.S. Cl.
USPC .......... 700/287; 700/289; 137/86; 137/487.5; 251/30.02; 251/30.05; 251/129.04

(58) Field of Classification Search
USPC ........................ 700/287, 289; 137/86, 487.5; 251/30.02, 30.05, 129.04
See application file for complete search history.

(56) References Cited

U.S. PATENT DOCUMENTS

| | | | | |
|---|---|---|---|---|
| 2,935,077 A | * | 5/1960 | Keyser .............................. | 137/82 |
| 2,939,472 A | * | 6/1960 | Eller ................................ | 137/82 |
| 2,949,273 A | * | 8/1960 | Gilchrist et al. ................. | 251/26 |
| 3,219,046 A | * | 11/1965 | Waugh .............................. | 137/8 |
| 3,225,785 A | * | 12/1965 | Goike ............................ | 137/486 |
| 3,285,266 A | * | 11/1966 | De Zurik ........................ | 137/86 |
| 4,961,441 A | * | 10/1990 | Salter ............................... | 137/14 |
| 5,251,148 A | * | 10/1993 | Haines et al. ................. | 700/282 |

(Continued)

FOREIGN PATENT DOCUMENTS

| | | |
|---|---|---|
| CN | 1219663 A | 6/1999 |
| CN | 1438427 A | 8/2003 |

(Continued)

OTHER PUBLICATIONS

Chinese Office Action, dated Nov. 5, 2012, which issued during the prosecution of Chinese Patent Application No. 201110089580.2.

Primary Examiner — Ronald Hartman, Jr.

(74) Attorney, Agent, or Firm — Troutman Sanders LLP

(57) ABSTRACT

A positioner operating mode identifying function is provided in a calculating unit. A pressure value of an amplified pneumatic pressure signal, from a single-mode pilot relay, is detected by a pressure sensor and sent to the calculating unit. The calculating unit, through the positioner operating mode identifying function, monitors a change in the amplified pneumatic pressure signal corresponding to a change in the control signal, and if the direction of change in the control output and the direction of change of the amplified pneumatic pressure signal are the identical direction, identifies the operating mode of the positioner as the positive operating mode. The operating mode of the positioner is identified as the negative operating mode if the direction of change in the control output and the direction of change of the amplified pneumatic pressure signal are the opposite directions. The identification results displayed on a screen of a display unit.

5 Claims, 7 Drawing Sheets

(56) References Cited

U.S. PATENT DOCUMENTS

| | | | |
|---|---|---|---|
| 5,431,182 A | 7/1995 | Brown | |
| 5,549,137 A * | 8/1996 | Lenz et al. | 137/486 |
| 5,931,180 A | 8/1999 | Nagasaka | |
| 6,202,680 B1 * | 3/2001 | Irokawa et al. | 137/487.5 |
| 6,218,541 B1 * | 4/2001 | Wang | 546/35 |
| 6,512,960 B1 * | 1/2003 | Schulz | 700/56 |
| 6,776,389 B2 | 8/2004 | Ito | |
| 6,907,082 B1 * | 6/2005 | Loechner | 375/257 |
| 7,167,537 B2 * | 1/2007 | Loechner | 375/377 |
| 7,505,818 B1 * | 3/2009 | Kohler | 700/19 |
| 7,940,189 B2 * | 5/2011 | Brown | 340/621 |
| 2004/0039488 A1 * | 2/2004 | Junk et al. | 700/282 |

FOREIGN PATENT DOCUMENTS

| | | |
|---|---|---|
| CN | 201014008 Y | 1/2008 |
| JP | 62-28118 U | 2/1987 |
| JP | 11-118526 A | 4/1999 |
| JP | 2004151941 A | 5/2004 |
| JP | 2007164230 A | 6/2007 |

* cited by examiner

FIG. 2

Positioner Operating Mode Identifying Logic

| Direction of Change of Control Output K | Direction of Change of Amplified Pneumatic Pressure Signal Pout | Operating Mode of Positioner |
|---|---|---|
| + | + | Positive |
| - | - | Positive |
| + | - | Negative |
| - | + | Negative |

FIG. 4

Electro-Pneumatic Converting Device Operating Mode Identification Logic

| Direction of Change of Control Output K | Direction of Change of Pneumatic Pressure Signal Pn | Operating Mode of Electro-Pneumatic Converting Device |
|---|---|---|
| + | + | Positive |
| - | - | Positive |
| + | - | Negative |
| - | + | Negative |

FIG. 5

Pilot Relay Operating Mode Identifying Logic

| Direction of Change of Pneumatic Pressure Signal Pn | Direction of Change of Amplified Pneumatic Pressure Signal Pout | Operating Mode of Pilot Relay |
|---|---|---|
| + | + | Positive |
| - | - | Positive |
| + | - | Negative |
| - | + | Negative |

FIG. 6

Positioner Operating Mode Determining Logic

| Operating Mode of Electro-Pneumatic Converting Device | Operating Mode of Pilot Relay | Operating Mode of Positioner |
|---|---|---|
| Positive | Positive | Positive |
| Negative | Negative | Positive |
| Positive | Negative | Negative |
| Negative | Positive | Negative |

FIG. 9

| Positioner Positive/Negative Operating Parameter Storing Portion | | | |
|---|---|---|---|
| | | Pilot Relay Operating Mode | |
| | | Positive | Negative |
| Electro-Pneumatic Converting Device Operating Mode | Positive | Parameter Setting 1 | Parameter Setting 2 |
| | Negative | Parameter Setting 3 | Parameter Setting 4 |

FIG. 10

| Positioner Positive/Negative Operating Parameter Storing Portion | | | |
|---|---|---|---|
| | | Pilot Relay Operating Mode | |
| | | Positive | Negative |
| Electro-Pneumatic Converting Device Operating Mode | Positive (Negative) | Parameter Setting 1 (Parameter Setting 3) | Parameter Setting 2 (Parameter Setting 4) |

FIG. 11

| Positioner Positive/Negative Operating Parameter Storing Portion | | |
|---|---|---|
| | | Pilot Relay Operating Mode |
| | | Positive (Negative) |
| Electro-Pneumatic Converting Device Operating Mode | Positive | Parameter Setting 1 (Parameter Setting 2) |
| | Negative | Parameter Setting 3 (Parameter Setting 4) |

FIG. 12

| | Electro-Pneumatic Converting Device | Pilot Relay | Positioner |
|---|---|---|---|
| Operating Mode | Positive | Positive | Positive |
| | Negative | Negative | |
| | Positive | Negative | Negative |
| | Negative | Positive | |

POSITIONER

CROSS REFERENCE TO RELATED APPLICATIONS

The present application claims priority under 35 U.S.C. §119 to Japanese Patent Application No. 2010-079365, filed Mar. 30, 2010, which is incorporated herein by reference.

FIELD OF TECHNOLOGY

The present invention relates to a positioner for controlling the opening of a control valve by calculating a valve opening setting value sent from a higher-level device and an actual opening value fed back from the control valve that is being controlled, to generate, as a control output, an electric signal in accordance with the deviation, and then converting this generated control output into an air pressure signal, and then amplifying.

BACKGROUND OF THE INVENTION

Conventionally, positioners have been provided in control valves, where the valve opening of the control valve is controlled by the positioner. This positioner includes a calculating unit for calculating a deviation between a control valve opening setting value sent from a higher-level device and an actual opening value that is fed back from the control valve, to generate, as a control output, an electric signal in accordance with this deviation; an electro-pneumatic converting device for converting, into a pneumatic pressure signal, the control output generated by the calculating unit; and a pilot relay for amplifying the pneumatic pressure signal, converted by the electro-pneumatic converting device and outputting the result, as a pneumatic pressure signal, to an operating device for the control valve (See, for example, Japanese Unexamined Patent Application Publication S62-28118).

In this positioner, the pneumatic converting device and pilot relay each may be of a positive operating mode or a negative operating mode. That is, the positive operating mode is of an operating system of a nature wherein the greater the input, the greater the output will be, where, on the other hand, the negative operating mode is of an operating system having a nature wherein the greater the input, the smaller the output will be. Given this, the operating mode of the positioner itself depends on the forms of operation of the built-in electro-pneumatic converting device and pilot relay. That is, as illustrated in FIG. 12, if the modes of operation of the electro-pneumatic converting device and the pilot relay are identical, then the positioner will be of the positive operating mode, but if the modes of operation of the electro-pneumatic converting device and of the pilot relay are opposite from each other, then the mode of operation of the positioner will be the negative. Furthermore, the type of positioner to use, in terms of the type of operating mode, is determined by the operating mode of the control valve wherein the opening is controlled by the positioner.

Here if, for example, a change is produced so as to control a control valve of the opposite operating mode from the control valve that has been controlled until that point, or if there is a failure in a positioner that has controlled the control valve, making it necessary to replace suddenly with a spare positioner, where this spare positioner and control valve are of different operating modes, then the operating mode of the positioner is changed through changing the operating mode of the built-in electro-pneumatic converting device through changing the direction of the electric current supplied to a magnetic excitation coil (See, for example, Japanese Unexamined Patent Application Publication 11-118526). Additionally, if the pilot relay that is built into the positioner is a multimode pilot relay (of a type wherein it is possible to select the positive operating mode or the negative operating mode), then the operating mode of the positioner can be changed by selecting the opposite operating mode from that which had been used up to that point.

However, in a conventional positioner it is not possible to know easily the actual operating mode of the positioner. Because of this, if an operator is instructed to change the operating mode of a positioner but has forgotten to change the setting or makes an error in changing the setting, it may be set in the control valve without the error being discovered, and thus there is a risk that not only will the control of the opening not be performed correctly because the operating mode of the positioner does not match the operating mode of the control valve, but there is also the risk of producing a problem that causes a failure in the system wherein the flow of the fluid is controlled by the control valve.

The present invention was created in order to solve the problem as set forth above, and the object thereof is to provide a positioner wherein it is possible to discern easily the current operating mode of the positioner.

SUMMARY OF THE INVENTION

The invention by which to achieve this object is a positioner including: control output generating means for calculating a deviation between a valve opening setting value sent from a higher-level device and an actual opening value that is fed back from a control valve that is subject to control, to generate, as a control signal, an electric signal in accordance with the deviation; electro-pneumatic converting means for converting into a pneumatic pressure signal the control output generated by the control output generating means; and pneumatic pressure signal amplifying means for amplifying the pneumatic pressure signal that was converted by the electro-pneumatic converting means and outputting, to an operating device for the control valve, as an amplified pneumatic pressure signal; having a positioner operating mode identifying means for identifying automatically whether the operating mode of the positioner (the operating mode of the positioner itself) is in the positive operating mode wherein the greater the control output the greater the amplified pneumatic pressure signal, or the negative operating mode wherein the greater the control output the less the amplified pneumatic pressure signal.

In this invention, the positioner operating mode identifying means identify the current operating mode of the positioner itself as the positive operating mode when the operating mode of the positioner has been changed from the positive operating mode to the negative operating mode, and identifies the current operating mode of the positioner itself as the negative operating mode if the operating mode of the positioner has been changed from the negative operating mode to the positive operating mode.

The present invention is provided with positioner mode identifying means that identify the operating mode of the positioner as either the positive operating mode, wherein the greater the control output the greater the amplified pneumatic pressure signal, or the negative operating mode, wherein the greater the control output the less the amplified pneumatic pressure signal, making it possible to know easily the current operating mode of the positioner itself from the results of the identification by the positioner operating mode identifying means.

BRIEF DESCRIPTION OF THE DRAWINGS

FIG. 2 is a diagram illustrating the identifying logic for identifying the operating mode of the positioner by a calculating unit in the positioner.

FIG. 4 is a diagram illustrating the identifying logic for identifying the operating mode of the positioner by a calculating unit in the electro-pneumatic converting device.

FIG. 5 is a diagram illustrating the identifying logic for identifying the operating mode of the positioner by a calculating unit in the pilot relay device.

FIG. 6 is a diagram illustrating the determining logic for determining the operating mode of the positioner by a calculating unit in the positioner.

FIG. 9 is a diagram illustrating an example of storing, in a positioner positive/negative operating parameter storing portion, four different parameter settings depending on the combination of the electro-pneumatic converting device and the multimode pilot relay operating mode combinations.

FIG. 10 is a diagram illustrating an example of storing, in a positioner positive/negative operating parameter storing portion, two different parameter settings when the operating mode of the electro-pneumatic converting device is unchanging and only the operating mode of the multimode pilot relay changes.

FIG. 11 is a diagram illustrating an example of storing, in a positioner positive/negative operating parameter storing portion, two different parameter settings when the operating mode of the multimode pilot relay is unchanging and only the operating mode of the electro-pneumatic converting device changes.

FIG. 12 is a diagram illustrating the relationship between the operating modes of the electro-pneumatic converting device and the pilot relay in the positioner, and the operating mode of the positioner.

DETAILED DESCRIPTION OF THE PRESENT INVENTION

Figure 1:
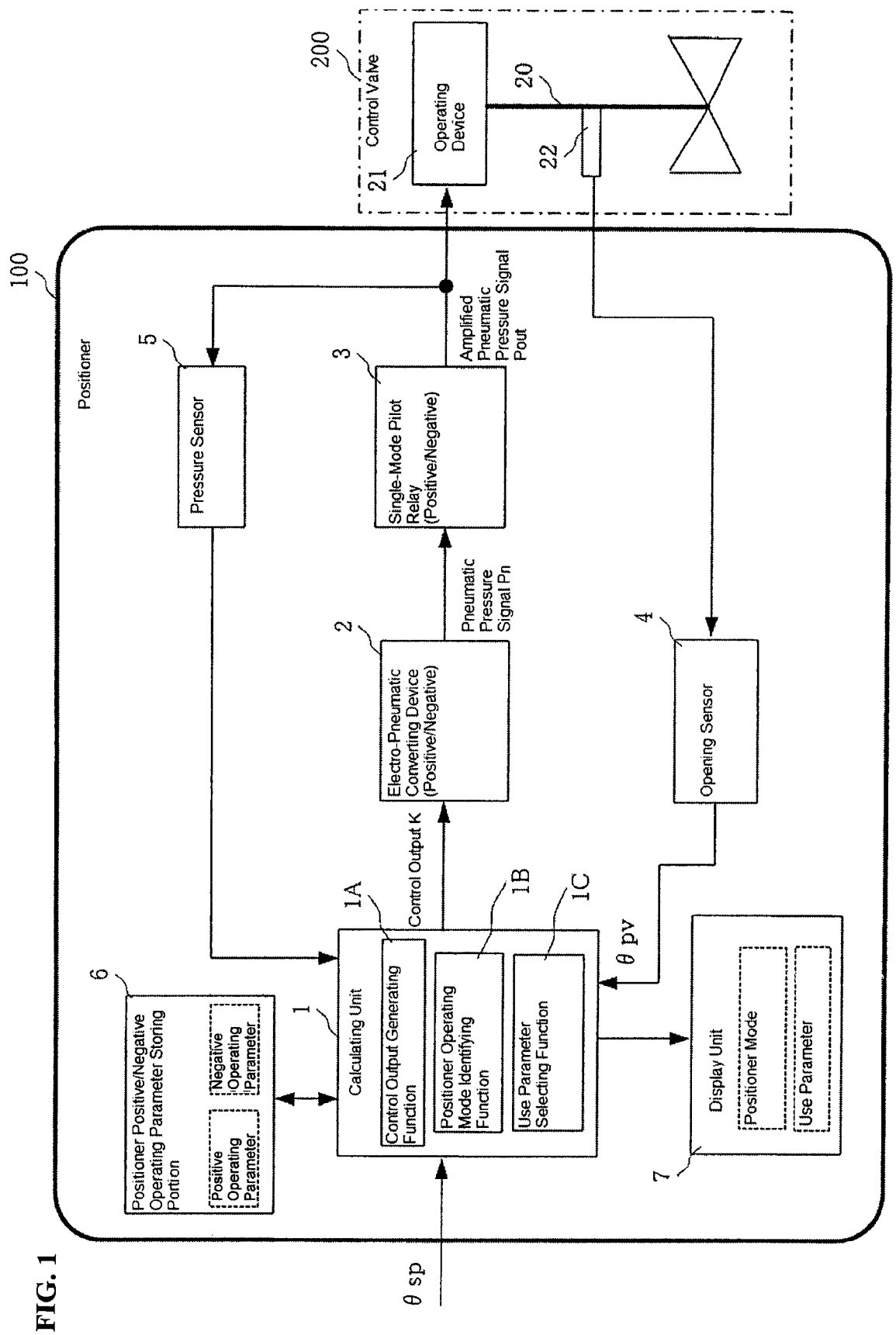
FIG. 1 is a block diagram illustrating an example of a positioner according to the present invention.

An example according to the present invention will be explained below in detail, based on the drawings FIG. 1 is a block diagram illustrating an example of a positioner according to the present invention. In this figure, 100 is a positioner according to the present invention and 200 is a control valve wherein the opening thereof is adjusted by the positioner 100. The control valve 200 has an operating device 21 that drives a valve rod 20, and a feedback mechanism 22 that feeds back the amount of dislocation in the upward or downward direction at the valve rod 20.

The positioner 100 includes a calculating unit 1 for calculating a deviation between a valve opening setting value $\theta sp$, sent from a higher-level device (not shown), and an actual opening $\theta pv$, and back from the control valve 200, and for generating an electric signal, as a control output K, in accordance with this deviation; an electro-pneumatic converting device 2 for converting, into a pneumatic pressure signal (a nozzle back pressure) Pn, the control output K that was generated by the calculating unit 1; a single operating mode pilot relay (hereinafter termed a single-mode pilot relay) 3 for amplifying the pneumatic pressure signal Pn, converted by the electro-pneumatic converting device 2, and outputting to an operating device 21 of the control valve 200 as an amplified pneumatic pressure signal Pout; a valve opening sensor 4; a pressure sensor 5; a positioner positive/negative operating parameter storing portion 6; and a display unit 7. The single-mode pilot relay 3 is a pilot relay wherein the operating mode is either the positive operating mode or the negative operating mode, but not both.

The valve opening sensor 4 detects the degree of opening of the control valve 200 from the amount of dislocation of the valve rod 20 fed back by the feedback mechanism 22, and sends the detected valve opening to the calculating unit 1 as the actual opening value $\theta pv$. The pressure sensor 5 detects the pressure value of the amplified pneumatic pressure signal Pout from the single-mode pilot relay 3 and sends it to the calculating unit 1.

The positive operating parameter that is used when the operating mode of the positioner 100 is the positive operating mode, and the negative operating parameter that is used when the operating mode of the positioner 100 is the negative operating mode are stored in the positioner positive/negative operating parameter storing portion 6. In this positioner 100, a proportional gain, an integral gain, a differential gain, or another type of parameter may be used as the positive operating or negative operating parameter, where each of these types of parameters are divided into those for use in a positive operating mode and those for use in a negative operating mode, and stored as the positive operating parameter and negative operating parameter in the positioner positive/negative operating parameter storing portion 6.

Calculating unit 1 is achieved through hardware having a processor, a storing portion, and the like, and a program that achieves the various functions working in cooperation with the hardware, where, in addition to the control output generating function 1A that generates the control output K, there are also, as functions that are unique to the present form of embodiment, a positioner operating mode identifying function 1B and a use parameter selecting function 1C.

Positioner Operating Mode Identifying Function

The calculating unit 1 monitors the change in the amplified pneumatic pressure signal Pout corresponding to a change in the control output K through the positioner operating mode identifying function 1B to identify the operating mode of the positioner 100 as the positive operating mode if the direction of change of the control output K and the direction of change of the amplified pneumatic pressure signal Pout are the same direction, and, on the other hand, to identify the operating mode of the positioner 100 as the negative operating mode if the direction of change of the control output K and the direction of change of the amplified pneumatic pressure signal Pout are different directions. The identified operating mode is set as the current operating mode of the positioner 100 itself.

FIG. 2 illustrates the identification logic for the operating mode of the positioner by the positioner operating mode identifying function 1B. As can be seen from this identifying logic, through the positioner operating mode identifying function 1B, the calculating unit 1 identifies the operating mode of the positioner 100 as the positive operating mode if the direction of change of the control output K is "+" and the direction of change of the amplified pneumatic pressure signal Pout is "+" or if the direction of change of the control output K is "−" and the direction of change of the amplified pneumatic pressure signal Pout is "−". In contrast, it identifies the operating mode of the positioner 100 as the negative operating mode if the direction of change of the control output K is "+" and the direction of change of the amplified pneumatic pressure signal Pout is "−" or if the direction of change of the control output K is "−" and the direction of change of the amplified pneumatic pressure signal Pout is "+".

Display of the Operating Mode of the Positioner

The calculating unit 1 sends, to the display unit 7, the operating mode of the positioner 100 (the current operating mode of the positioner 100 itself), identified by the positioner operating mode identifying function 113, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Selection of the Use Parameter

In the calculating unit 1, the parameter that corresponds with the operating mode identified by the positioner operating mode identifying function 1B, of the positive operating parameter or the negative operating parameter, stored in the positioner positive/negative operating parameter storing portion 6 is selected, by the use parameter selecting function 1C, as the parameter that will actually be used. Furthermore, the selected parameter is set as the use parameter for the positioner 100.

Display of the Use Parameter

Additionally, the calculating unit 1 sends, to the display unit 7, the use parameter selected by the use parameter selecting function 1C, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Change in the Operating Mode of the Positioner

In an example, the operating mode of the positioner 100 is the positive operating mode, and it is changed to the negative operating mode. For example, while the direction of change in the control output K was "+" and the direction of change in the amplified pneumatic pressure signal Pout was "+." Also a change in the direction of the electric current supplied to the magnetic excitation coil (not shown) in the electro-pneumatic converting device 2 causes the direction of change in the control output K to be "+" and the direction of change in the amplified pneumatic pressure signal Pout to be "−".

The calculating unit 1 monitors the change in the amplified pneumatic pressure signal Pout in accordance with the change in the control output K by the positioner operating mode identifying function 1B. When the direction of change of the control output K is "+" and the direction of change in the amplified pneumatic pressure signal Pout is "−", then the calculating unit 1 identifies, through the positioner operating mode identifying function 1B, that the operating mode of the positioner 100 is the negative operating mode. The result of this identification is both set as the current operating mode of the positioner 100 itself, and displayed on the screen of the display unit 7.

Additionally, when the calculating unit 1 identifies that the operating mode of the positioner 100 is the negative operating mode, it selects, through the use parameter selecting function 1C, the negative operating parameter, corresponding to the operating mode that has been identified, from the positive operating parameter and the negative operating parameter stored in the positioner positive/negative operating parameter storing portion 6, as the parameter that will actually be used. Furthermore, the selected parameter is set as the use parameter for the positioner 100. That is, the use parameter until that point is changed and set automatically from the positive operating parameter to the negative operating parameter. The use parameter for which the setting has been changed is displayed on the screen of the display unit 7.

Note that while in this example there was an explanation of the operating mode of the positioner 100 being the positive operating mode and changing to the negative operating mode, the same is true for the case wherein the operating mode of the positioner 100 is the negative operating mode and there is a change to the positive operating mode, where the operating mode of the positioner 100 is identified, and the identified operating mode is set as the current operating mode of the positioner 100 itself and displayed on the display unit 7. Moreover, the change in setting of the use parameter accompanying the operating mode that has been identified for the positioner 100 is performed automatically.

Figure 3:
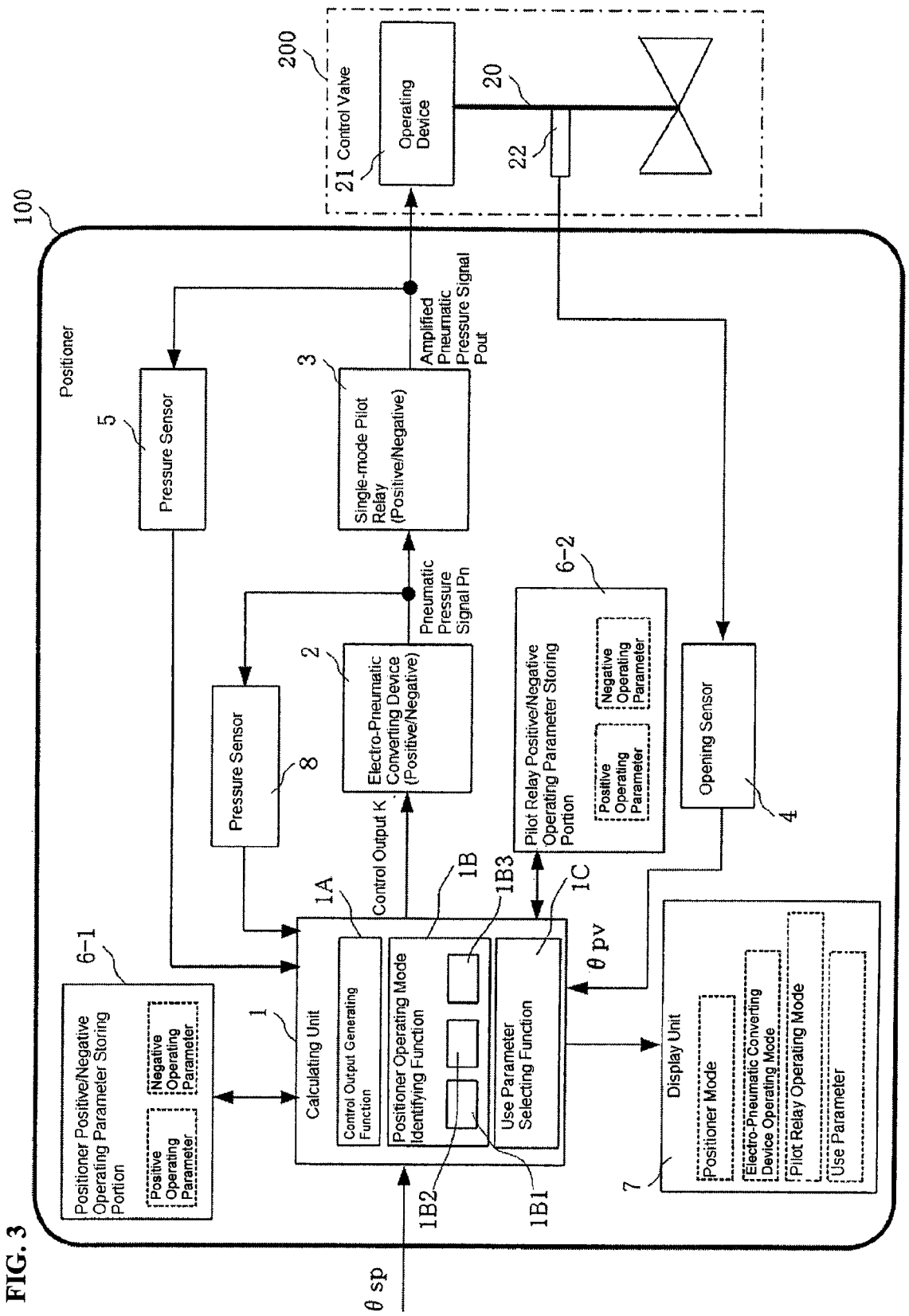
FIG. 3 is a block diagram illustrating another example of a positioner according to the present invention.

FIG. 3 is a block diagram illustrating another example according to the present invention. In this example, a pressure sensor 8 for detecting the value of the pressure of the pneumatic pressure signal Pn from the electro-pneumatic converting device 2 is provided in addition to the structure from the example of FIG. 1, where the pressure sensor 8 sends the pressure value for the pneumatic pressure signal Pn thus detected to the calculating unit 1.

Moreover, instead of the positioner positive/negative operating parameter storing portion 6, an electro-pneumatic converter positive/negative operating parameter storing portion 6-1 and a pilot relay positive/negative operating parameter storing portion 6-2 are provided, where the positive operating parameter that is used when the operating mode of the electro-pneumatic converting device 2 is the positive mode, and the negative operating parameter that is used when the operating mode of the electro-pneumatic converting device 2 is the negative mode are stored in the electro-pneumatic converting device positive/negative operating parameter storing portion 6-1, and the positive operating parameter that is used when the operating mode of the single-mode pilot relay 3 is the positive operating mode, and the negative operating parameter that is used when the operating mode of the single-mode pilot relay 3 is the negative operating mode are stored in the pilot relay positive/negative operating parameter storing portion 6-2.

Additionally, an electro-pneumatic converting device operating mode identifying function 1B1, a pilot relay operating mode identifying function 1B2, and a positioner operating mode determining function 1B3, are provided as functions that structure the positioner operating mode identifying function 1B in the calculating unit 1.

Electro-pneumatic Converting Device Operating Mode Identifying Function

In this example, the calculating unit 1 monitors the change in the pneumatic pressure signal Pn corresponding to a change in the control output K, through the electro-pneumatic converting device operating mode identifying function 1B1, and identifies the operating mode of the electro-pneumatic converting device 2 as the positive operating mode if the direction of change of the control output K and the direction of change of the pneumatic pressure signal Pn are the same direction, but identifies the operating mode of the electro-pneumatic converting device 2 as the negative operating mode if the direction of change of the control output K and the direction of change of the pneumatic pressure signal Pn are opposite directions.

FIG. 4 shows the logic for identifying the operating mode of the electro-pneumatic converting device in the electro-pneumatic converting device operating mode identifying function 1B1. As can be understood from this identifying logic, the calculating unit 1, through the electro-pneumatic converting device operating mode identifying function 1B1, identifies the operating mode of the electro-pneumatic converting device 2 as the positive operating mode if the direction of change of the control output K is "+" and the direction of change of the pneumatic pressure signal Pn is "+", or if the direction of change of the control output K is "−" in the direction of change of the pneumatic pressure signal Pn is "−". In contrast, it identifies the operating mode of the electro-pneumatic converting device 2 as the negative operating mode if the direction of change of the control output K is "+" and the direction of change of the pneumatic pressure signal Pn is "−" or if the direction of change of the control output K is "−" and the direction of change of the pneumatic pressure signal Pn is "+".

Pilot Relay Operating Mode Identifying Function

In this example, the calculating unit 1 monitors the change in the amplified pneumatic pressure signal Pout corresponding to a change in the pneumatic pressure signal Pn through the pilot relay operating mode identifying function 1B2 to identify the operating mode of the single-mode pilot relay 3 as the positive operating mode if the direction of change of the pneumatic pressure signal Pn and the direction of change of the amplified pneumatic pressure signal Pout are the same direction, and, on the other hand, to identify the operating mode of the pilot relay 3 as the negative operating mode if the direction of change of the pneumatic pressure signal Pn and the direction of change of the amplified pneumatic pressure signal Pout are different directions.

FIG. 5 illustrates the identification logic for the operating mode of the pilot relay by the pilot relay operating mode identifying function 1B2. As can be seen from this identifying logic, through the pilot relay operating mode identifying function 1B2, the calculating unit 1 identifies the operating mode of the single-mode pilot relay 3 as the positive operating mode if the direction of change of the pneumatic pressure signal Pn is "+" and the direction of change of the amplified pneumatic pressure signal Pout is "+" or if the direction of change of the pneumatic pressure signal Pn is "−" and the direction of change of the amplified pneumatic pressure signal Pout is "−". In contrast, it identifies the operating mode of the single-mode pilot relay 3 as the negative operating mode if the direction of change of the pneumatic pressure signal Pn is "+" and the direction of change of the amplified pneumatic pressure signal Pout is "−" or if the direction of change of the pneumatic pressure signal Pn is "−" and the direction of change of the amplified pneumatic pressure signal Pout is "+".

Positioner Operating Mode Determining Function

In this example, the calculating unit 1, through the positioner operating mode determining function 1B3, determines the operating mode of the positioner 100 from the identification results for the operating mode of the electro-pneumatic converting device 2 by the electro-pneumatic converting device operating mode identifying function 1B1 and the identification results for the operating mode for the single-mode pilot relay 3 by the pilot relay operating mode identifying function 1B2. The operating mode that is determined is set as the current operating mode for the positioner 100 itself.

FIG. 6 illustrates the determining logic for the operating mode of the positioner by the positioner operating mode determining function 1B3. As can be understood from this determining logic, the calculating unit 1, through the positioner operating mode determining function 1B3, determines that the operating mode of the positioner 100 is the positive operating mode when the identification result or the operating mode of the electro-pneumatic converting device 2 is "positive operating mode" and the identification result for the operating mode of the single-mode pilot relay 3 is the "positive operating mode" or when the identification result for the operating mode of the electro-pneumatic converting device 2 is "negative operating mode" and the identification result for the operating mode of the single-mode pilot relay 3 is the "negative operating mode". In contrast, the calculating unit 1, through the positioner operating mode determining function 1B3, determines that the operating mode of the positioner 100 is the negative operating mode when the identification result for the operating mode of the electro-pneumatic converting device 2 is "positive operating mode" and the identification result for the operating mode of the single-mode pilot relay 3 is the "negative operating mode" or when the identification result for the operating mode of the electro-pneumatic converting device 2 is "negative operating mode" and the identification result for the operating mode of the single-mode pilot relay 3 is the "positive operating mode". The determination result by the positioner operating mode determining function 1B3 is defined as the identification result for the operating mode of the positioner 100 by the positioner operating mode identifying function 1B.

Positioner Operating Mode Display

The calculating unit 1 sends to the display unit 7, to be displayed on the screen of the display unit 7, the operating mode of the positioner 100 (the current operating mode of the positioner 100 itself) that has been identified by the positioner operating mode identifying function 1B, the operating mode of the electro-pneumatic converting device 2 (the current operating mode of the electro-pneumatic converting device 2) that has been identified by the electro-pneumatic converting device operating mode identifying function 1B1, and the operating mode for the single-mode pilot relay 3 (the current operating mode of the single-mode pilot relay 3) that has been identified by the pilot relay operating mode identifying function 1B2.

Note that the display of the operating mode identified for the positioner (including the operating mode of the electro-pneumatic converting device and the operating mode of the pilot relay) may be such that it is displayed only when there has been an instruction from an operator. Moreover, the operating mode identified for the positioner (including the operating mode of the electro-pneumatic converting device and the operating mode of the pilot relay) may be outputted to the outside on a transmission line, to notify an operator in a remote location, and to be used when performing maintenance, and the like.

Selection of the Use Parameter

In the calculating unit 1, the parameter that corresponds with the operating mode identified by the electro-pneumatic converting device operating mode identifying function 1B1, of the positive operating parameter or the negative operating parameter, stored in the electro-pneumatic converting device positive/negative operating parameter storing portion 6-1 is selected, by the use parameter selecting function 1C, as the parameter that will actually be used. Additionally, the parameter that corresponds with the operating mode identified by the pilot relay operating mode identifying function 1B2, of the positive operating parameter or the negative operating parameter, stored in the pilot relay positive/negative operating parameter storing portion 6-2 is selected as the parameter that will actually be used. Furthermore, the selected parameter is set as the use parameter for the positioner 100.

Display of the Use Parameter

Additionally, the calculating unit 1 sends, to the display unit 7, the use parameter selected by the use parameter selecting function 1C, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Change in the Operating Mode of the Positioner

In an example, the operating mode of the positioner 100 is the positive operating mode, and it has been changed to the negative operating mode. For example, while operating modes of both the electro-pneumatic converting device 2 and the single-mode pilot relay 3 were the positive operating mode and the direction of change in the control output K was "+" and the direction of change in the amplified pneumatic pressure signal Pout was "+." Also, a change in the direction of the electric current supplied to the magnetic excitation coil (not shown) in the electro-pneumatic converting device 2 causes the direction of change in the control output K to be "+" and the direction of change in the amplified pneumatic pressure signal Pout to be "−". In this case, the operating mode of the electro-pneumatic converting device 2 becomes the negative operating mode, and thus when the direction of change of the control output K goes to "+", the direction of change of the pneumatic pressure signal Pn goes to "−". In addition, the operating mode of the single-mode pilot relay 3 becomes the positive operating mode, and thus when the direction of change of the pneumatic pressure signal Pn goes to "−", the direction of change of the amplified pneumatic pressure signal Pout goes to "−".

The calculating unit 1 monitors the change in the pneumatic pressure signal Pn in accordance with the change in the control output K by the pneumatic converting device operating mode identifying function 1B1. When the direction of change of the control output K is "+" and the direction of change in the pneumatic pressure signal Pn goes to "−", then the calculating unit 1 identifies, through the electro-pneumatic converting device operating mode identifying function 1B1, that the operating mode of the electro-pneumatic converting device 2 is the negative operating mode. That is, the current operating mode of the electro-pneumatic converting device 2 is identified as the negative operating mode.

Additionally the calculating unit 1 monitors the change in the amplified pneumatic pressure signal Pout in accordance with the change in the pneumatic pressure signal Pn by the pilot relay operating mode identifying function 1B2. When the direction of change of the pneumatic pressure signal Pu goes to "−" and the direction of change in the amplified pneumatic pressure signal Pout is "−", then the calculating unit 1 identifies, through the pilot relay operating mode identifying function 1B2, that the operating mode of the single-mode pilot relay 3 is the positive operating mode. That is, the current operating mode of the single-mode pilot relay 3 is identified as the positive operating mode.

Through this, the calculating unit 1, through the positioner operating mode determining function 1B3, determines that the operating mode of the positioner 100 is the negative operating mode from the identification result (negative operating mode) for the operating mode of the electro-pneumatic converting device 2 by the electro-pneumatic converting device operating mode identifying function 1B1 and the identification result for the operating mode (positive operating mode) for the single-mode pilot relay 3 by the pilot relay operating mode identifying function 1B2. The determination result by the positioner operating mode determining function 1B3 is defined as the identification result for the operating mode of the positioner 100 by the positioner operating mode identifying function 1B. The result of this identification is both set as the current operating mode of the positioner 100 itself, and displayed on the screen of the display unit 7.

Additionally, when the calculating unit 1 identifies that the operating mode of the electro-pneumatic converting device 2 is the negative operating mode, then it selects, as the parameter to actually be used, through the use parameter selecting function 1C, the negative operation parameter corresponding to the operating mode identified, of the positive operating parameter and the negative operating parameter stored in the electro-pneumatic converting device positive/negative operating parameter storing portion 6-1. Additionally, when the calculating unit 1 identifies that the operating mode of the single-mode pilot relay 3 is the positive operating mode, then it selects, as the parameter to actually be used, through the use parameter selecting function 1C, the positive operation parameter corresponding to the operating mode identified, of the positive operating parameter and the negative operating parameter stored in the pilot relay positive/negative operating parameter storing portion 6-2. Furthermore, the selected parameter is set as the use parameter for the positioner 100. That is, the use parameters that had been set to this point, were that the operating mode of the electro-pneumatic converting device 2 was the positive operating mode and the operating mode for the single-mode pilot relay 3 was the positive operating mode, are changed automatically to be set to use parameters wherein the operating mode for the electro-pneumatic converting device 2 is the negative operating mode and the operating mode for the single-mode pilot relay 3 is the positive operating mode. The use parameter for which the setting has been changed is displayed on the screen of the display unit 7.

Note that while in this example the explanation was for a case wherein the operating mode of the positioner 100 was the positive operating mode and there was a change to the negative operating mode, the same is true also for the case wherein the operating mode of the positioner 100 is the negative operating mode and there is a change to the positive operating mode, where the operating mode of the positioner 100 is identified based on the current operating mode of the electro-pneumatic converting device 2 and on the current operating mode of the single-mode pilot relay 3, and the identified operating mode is set as the current operating mode of the positioner 100 itself, and also displayed on the display unit 7. Additionally, the setting changes for the use parameters in accordance with the identified operating modes for the electro-pneumatic converting device 2 and the single-mode pilot relay 3 may be performed automatically.

Figure 7:
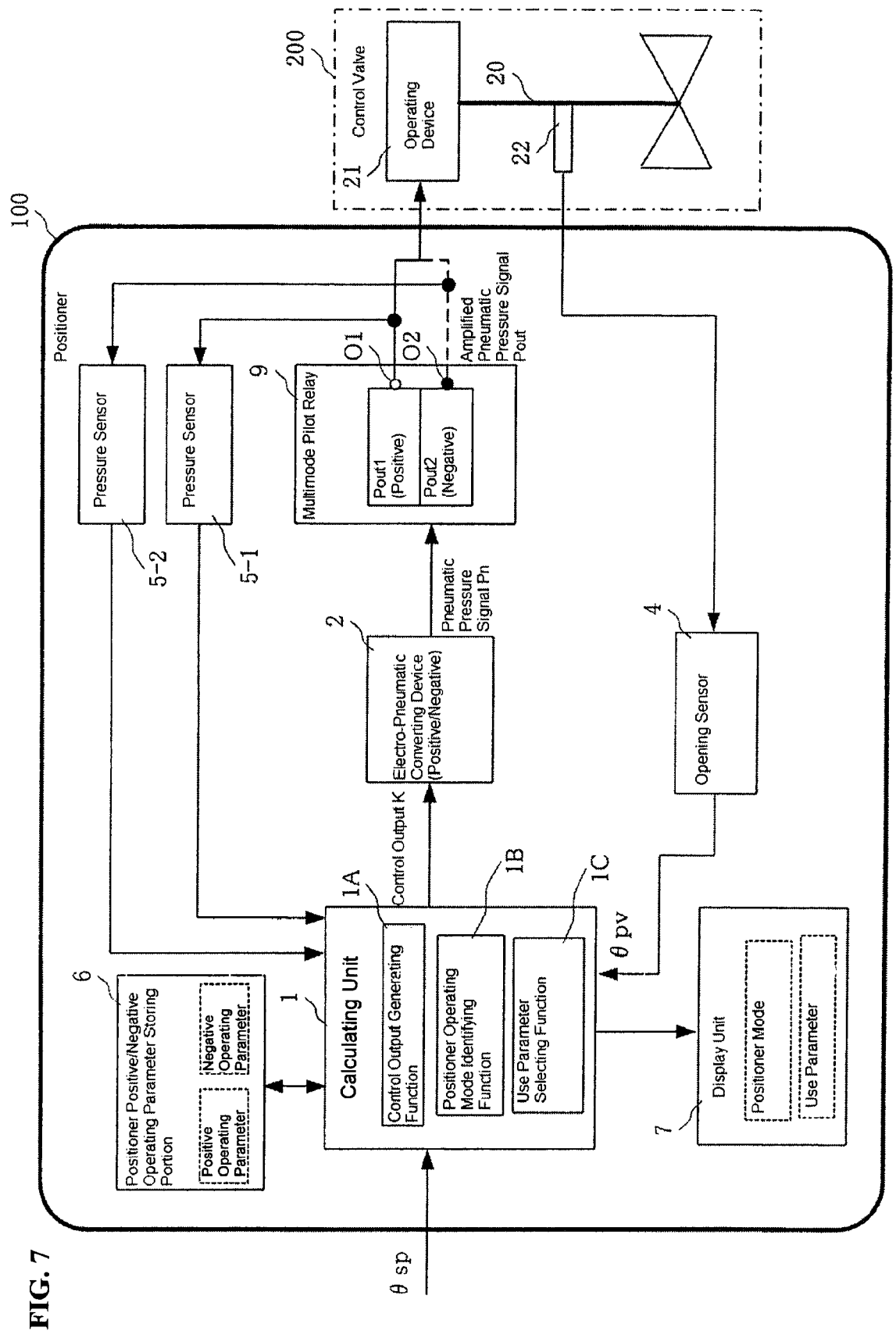
FIG. 7 is a block diagram illustrating a further example of a positioner according to the present invention.

FIG. 7 is a block diagram illustrating a further example of a positioner according to the present invention. In this example, a multiple operating mode pilot relay (hereinafter termed a "multimode pilot relay") 9 is used instead of the single-mode pilot relay 3 in the structure in the example above (FIG. 1), where a pressure value of an amplified pneumatic pressure signal Pout1, outputted from a first output port O1 of the multimode pilot relay 9 is detected by a pressure sensor 5-1, and is sent to the calculating unit 1 as the pressure value of the amplified pneumatic pressure signal Pout. Additionally, a pressure value of an amplified pneumatic pressure signal Pout2, outputted from a second output port O2 of the multimode pilot relay 9 is detected by a pressure sensor 5-2, and is sent to the calculating unit 1 as the pressure value of the amplified pneumatic pressure signal Pout.

The multimode pilot relay 9 is a pilot relay able to select either the positive operating mode or the negative operating mode as the operating mode thereof, where if the positive operating mode is selected, then the amplified pneumatic pressure signal Pout1 is outputted from the first output port O1, and if the negative operating mode is selected, then the amplified pneumatic pressure signal Pout2 is outputted from the second output port O2. In this example, as the state prior to the operating mode of the positioner 100 being changed, the multimode pilot relay 9 has the positive operating mode selected, so that the amplified pneumatic pressure value signal Pout1 is outputted from the first output port O1.

Change in the Operating Mode of the Positioner

At this point, let us assume that the operating mode of the positioner 100 is the positive operating mode, and it has been changed to the negative operating mode. For example, while the direction of change in the control output K was "+" and the direction of change in the amplified pneumatic pressure signal Pout (Pout1) was "+", let us assume the selection of the negative operating mode as the operating mode for the multimode pilot relay 9 causes the direction of change in the control output K to be "+" and the direction of change in the amplified pneumatic pressure signal Pout (Pout2) to be "−".

The calculating unit 1 monitors the change in the amplified pneumatic pressure signal Pout (Pout1, Pout2) in accordance with the change in the control output K by the positioner operating mode identifying function 1B. When, through the selection of the negative operating mode as the operating mode for the multimode pilot relay 9, the direction of change of the control output K is "+" and the direction of change in the amplified pneumatic pressure signal Pout (Pout2) is "−", then the calculating unit 1 identifies, through the positioner operating mode identifying function 1B, that the operating mode of the positioner 100 is the negative operating mode. The result of this identification is both set as the current operating mode of the positioner 100 itself, and displayed on the screen of the display unit 7.

Additionally, when the calculating unit 1 identifies that the operating mode of the positioner 100 is the negative operating mode, then it selects, as the parameter to actually be used, through the use parameter selecting function 1C, the negative operation parameter corresponding to the operating mode identified, of the positive operating parameter and the negative operating parameter stored in the positioner positive/negative operating parameter storing portion 6. Furthermore, the selected parameter is set as the use parameter for the positioner 100. That is, the use parameter until that point is changed and set automatically from the positive operating parameter to the negative operating parameter. The use parameter for which the setting has been changed is displayed on the screen of the display unit 7.

Note that in this case, the selection of the negative operating mode as the operating mode for the multimode pilot relay 9 was explained for the case wherein the operating mode of the positioner 100 was changed from the positive operating mode to the negative operating mode; however, the same is true also for the case wherein the operating mode of the electro-pneumatic converting device 2 is changed from the positive operating mode to the negative operating mode through a change in the direction of the supply of the electric current to the magnetic excitation coil, where the operating mode of the positioner 100 is identified, and that identified operating mode is set as the current operating mode of the positioner 100 itself, and also displayed on the display unit 7. Moreover, the setting changes for the use parameters in accordance with the identified operating mode of the positioner 100 are performed automatically.

The direction of change of the control output K is "+", the direction of change in the pneumatic pressure signal Pu is "−", and the direction of change in the amplified pneumatic pressure signal Pout (Pout1) is "−", and thus, in the calculating unit 1, the operating mode of the positioner 100 is identified as being the negative operating mode because the direction of change of the control output K is "+" in the direction of change of the amplified pneumatic pressure signal Pout (Pout1) is "−".

Additionally, while in this example there was an explanation of the operating mode of the positioner 100 being the positive operating mode and changing to the negative operating mode, the same is true for the case wherein the operating mode of the positioner 100 is the negative operating mode and there is a change to the positive operating mode, where the operating mode of the positioner 100 is identified, and the identified operating mode is set as the current operating mode of the positioner 100 itself and displayed on the display unit 7. Moreover, the change in setting of the use parameter accompanying the operating mode that has been identified for the positioner 100 is performed automatically.

Figure 8:
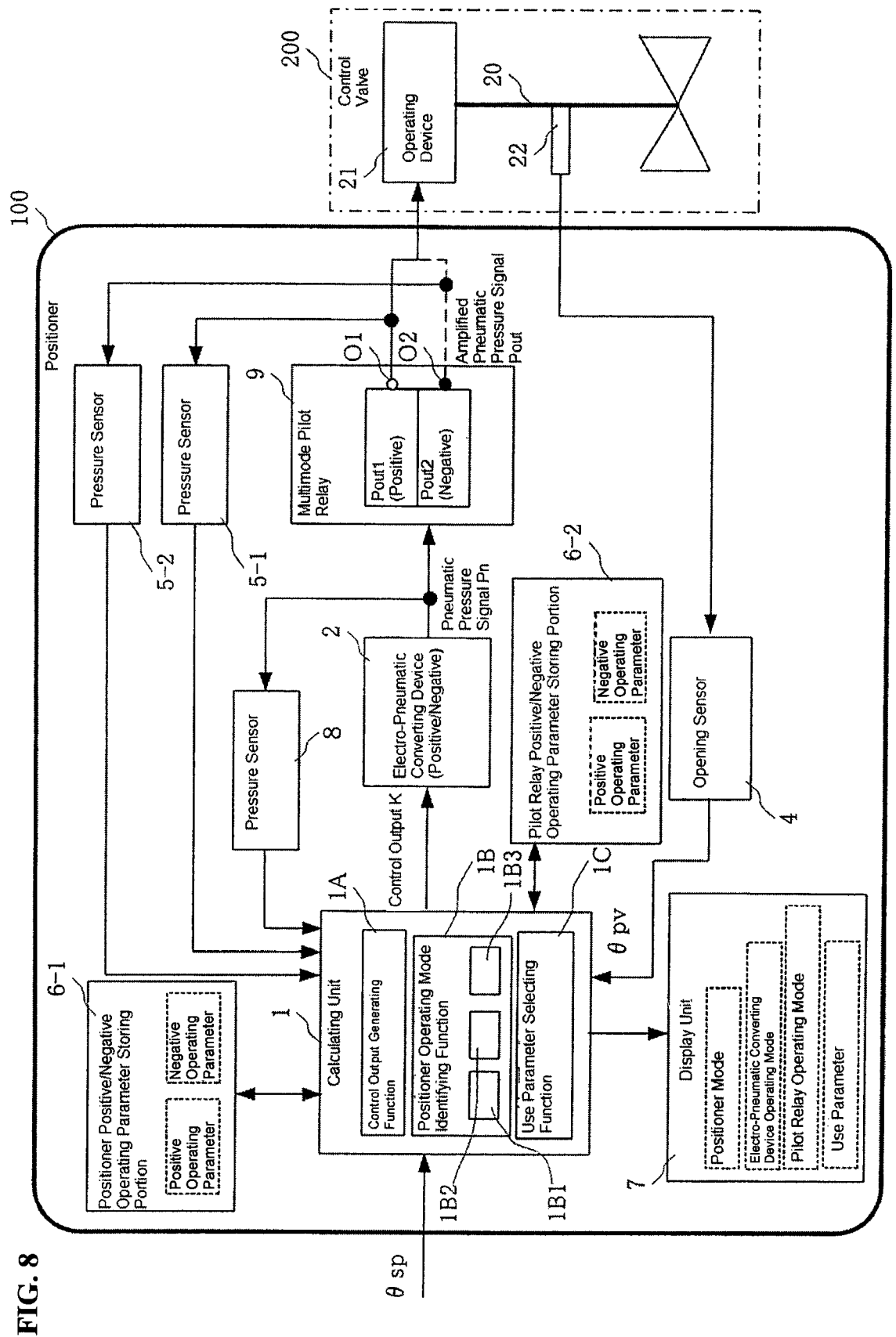
FIG. 8 is a block diagram illustrating an additional example of a positioner according to the present invention.

FIG. 8 is a block diagram illustrating yet a further example a fourth form of embodiment (Form of Embodiment 4) of a positioner according to the present invention. In this example, a pressure sensor 8 for detecting the value of the pressure of the pneumatic pressure signal Pn from the electro-pneumatic converting device 4 is provided in addition to the structure from Form the above example (FIG. 7), where the pressure sensor 8 sends the pressure value for the pneumatic pressure signal Pn thus detected to the calculating unit 7.

Additionally, instead of the positioner positive/negative operating parameter storing portion 6, as with the example of FIG. 3, an electro-pneumatic converting device positive/negative operating parameter storing portion 6-1 and a pilot relay positive/negative operating parameter storing portion 6-2 are provided. Additionally, an electro-pneumatic converting device operating mode identifying function 1B1, a pilot relay operating mode identifying function 1B2, and a positioner operating mode determining function 1B3, are provided as functions that structure the positioner operating mode identifying function 1B in the calculating unit 1.

Change in the Operating Mode of the Positioner

At this point, let us assume that the operating mode of the positioner 100 is the positive operating mode, and it has been changed to the negative operating mode. For example, while the direction of change in the control output K was "+" and the direction of change in the amplified pneumatic pressure signal Pout (Pout1) was "+", let us assume the selection of the negative operating mode as the operating mode for the multimode pilot relay 9 causes the direction of change in the control output K to be "+" and the direction of change in the amplified pneumatic pressure signal Pout (Pout2) to be "−".

The calculating unit 1 monitors the change in the pneumatic pressure signal Pn in accordance with the change in the control output K by the pneumatic converting device operating mode identifying function 1B1. In this case, when the direction of change of the control output K is "+" and the direction of change in the pneumatic pressure signal Pn remains as "+" without changing, then the calculating unit 1 identifies, through the electro-pneumatic converting device operating mode identifying function 1B1, that the operating mode of the electro-pneumatic converting device 2 is the positive operating mode. That is, the current operating mode of the electro-pneumatic converting device 2 is identified as the positive operating mode.

Additionally the calculating unit 1 monitors the change in the amplified pneumatic pressure signal Pout (Pout1, Pout2)

in accordance with the change in the pneumatic pressure signal Pn by the pilot relay operating mode identifying function 1B2. When the direction of change of the pneumatic pressure signal Pn is "+" and the direction of change in the amplified pneumatic pressure signal Pout (Pout2) goes to "−", then the calculating unit 1 identifies, through the pilot relay operating mode identifying function 1B2, that the operating mode of the multimode pilot relay 9 is the negative operating mode. That is, the current operating mode of the multimode pilot relay 9 is identified as the negative operating mode.

Through this, the calculating unit 1 through the positioner operating mode determining function 1B3, determines that the operating mode of the positioner 100 is the negative operating mode from the identification result (positive operating mode) for the operating mode of the electro-pneumatic converting device 2 by the electro-pneumatic converting device operating mode identifying function 1B1 and the identification result for the operating mode (negative operating mode) for the multimode pilot relay 9 by the pilot relay operating mode identifying function 1B2. The determination result by the positioner operating mode determining function 1B3 is defined as the identification result for the operating mode of the positioner 100 by the positioner operating mode identifying function 1B. The result of this identification is both set as the current operating mode of the positioner 100 itself, and displayed on the screen of the display unit 7.

Additionally, when the calculating unit 1 identifies that the operating mode of the electro-pneumatic converting device 2 is the positive operating mode, then it selects, as the parameter to actually be used, through the use parameter selecting function 1C, the positive operation parameter corresponding to the operating mode identified, of the positive operating parameter and the negative operating parameter stored in the electro-pneumatic converting device positive/negative operating parameter storing portion 6-1. Additionally, when the calculating unit 1 identifies that the operating mode of the multimode pilot relay 9 is the negative operating mode, then it selects, as the parameter to actually be used, through the use parameter selecting function 1C, the negative operation parameter corresponding to the operating mode identified, of the positive operating parameter and the positive operating parameter stored in the pilot relay positive/negative operating parameter storing portion 6-2. Furthermore, the selected parameter is set as the use parameter for the positioner 100. That is, the use parameters that had been set to this point, were that the operating mode of the electro-pneumatic converting device 2 was the positive operating mode and the operating mode for the multimode pilot relay 9 was the positive operating mode, are changed automatically to be set to use parameters wherein the operating mode for the electro-pneumatic converting device 2 is the positive operating mode and the operating mode for the multimode pilot relay 9 is the negative operating mode. The use parameter for which the setting has been changed is displayed on the screen of the display unit 7.

Note that in this case, the selection of the negative operating mode as the operating mode for the multimode pilot relay 9 was explained for the case wherein the operating mode of the positioner 100 was changed from the positive operating mode to the negative operating mode; however, the same is true also for the case wherein the operating mode of the electro-pneumatic converting device 2 is changed from the positive operating mode to the negative operating mode through a change in the direction of the supply of the electric current to the magnetic excitation coil, where the operating mode of the positioner 100 is identified based on the current operating mode of the electro-pneumatic converting device 2 and the current operating mode of the multimode pilot relay 9, and that identified operating mode is set as the current operating mode of the positioner 100 itself, and also displayed on the display unit 7. Additionally, the setting changes for the use parameters in accordance with the identified operating modes for the electro-pneumatic converting device 2 and the multimode pilot relay 9 may be performed automatically.

The direction of change of the control output K is "+", the direction of change in the pneumatic pressure signal Pn is "−", and the direction of change in the amplified pneumatic pressure signal Pout (Pout1) is "−", and thus, in the calculating unit 1, the operating mode of the positioner 100 is identified as being the negative operating mode based on the two identification results of the identification of the operating mode of the electro-pneumatic converting device 2 as the negative operating mode and the identification of the operating mode of the multimode pilot relay 9 as the positive operating mode.

Additionally, while in this example the explanation is for a case wherein the operating mode of the positioner 100 was the positive operating mode and there was a change to the negative operating mode, the same is true also for the case wherein the operating mode of the positioner 100 is the negative operating mode and there is a change to the positive operating mode, where the operating mode of the positioner 100 is identified based on the current operating mode of the electro-pneumatic converting device 2 and on the current operating mode of the multimode pilot relay 9, and the identified operating mode is set as the current operating mode of the positioner 100 itself, and also displayed on the display unit 7. Moreover, the change in setting of the use parameter accompanying the operating mode that has been identified for the positioner 100 is performed automatically.

In the example set forth above, the positive operating parameter that is used when the operating mode of the electro-pneumatic converting device 2 is the positive operating mode and the negative operating parameter that is used when the operating mode of the electro-pneumatic converting device 2 is the negative operating mode are stored in the electro-pneumatic converting device positive/negative operating parameter storing portion 6-1, and the positive operating parameter used when the operating mode of the multimode pilot relay 9 is the positive operating mode and the negative operating parameter used when the operating mode of the multimode pilot relay 9 is the negative operating mode are stored in the pilot relay positive/negative operating parameter storing portion 6-2; however, as illustrated in FIG. 9, four types of parameter settings may be stored, in accordance with the combinations of the operating modes of the electro-pneumatic converting device 2 and the multimode pilot relay 9, in the positioner positive/negative operating parameter storing portion 6.

Additionally, when the operating mode of the electro-pneumatic converting device 2 is unchanging and only the operating mode of the multimode pilot relay 9 changes, then, as illustrated in FIG. 10, conversely two types of parameters may be set and stored, depending on the combination of the operating modes of the electro-pneumatic converting device 2 and the multimode pilot relay 9. Similarly, when the multimode pilot relay 9 is unchanging and only the operating mode of the operating mode of the electro-pneumatic converting device 2 changes, then, as illustrated in FIG. 11, conversely two types of parameters may be set and stored, depending on the combination of the operating modes of the electro-pneumatic converting device 2 and the multimode pilot relay 9. As can be understood from the explanation above, in the positioners 100 illustrated above, the positioner operating mode identifying function 1B is provided in the calculating unit 1, thus making it possible to know easily the current operating mode of the positioner 100 itself from the results of the identification by the positioner operating mode identifying function 1B.

As a result, if an operator has been given an instruction to change the operating mode of the positioner 100 but the operator forgets to change the setting, or if the operator makes a mistake in the method of changing the setting, it is possible to know this in advance through checking the current operating mode of the positioner 100 itself, on the screen of the display unit 7. As a result, there is no risk of setting, in the control valve 200, a positioner 100 without discovering that the operating mode has not been changed, thus making it possible to control the opening correctly, without matching the operating mode of the positioner 100 and the operating mode of the control valve 200.

The positioner in the present invention is a device for converting an electric signal into an electro-pneumatic pressure signal, to control the opening of a control valve based on the converted electro-pneumatic pressure signal, and thus can be used in a variety of fields such as process control.

The invention claimed is:

1. A positioner comprising:
   a control output generator calculating a deviation between a valve opening setting value sent from a higher-level device and an actual opening value that is fed back from a control valve that is subject to control, to generate, as a control signal, an electric signal in accordance with the deviation;
   an electro-pneumatic converter converting into a pneumatic pressure signal a control output generated by the control output generator;
   a pneumatic pressure signal amplifier amplifying the pneumatic pressure signal converted by the electro-pneumatic converter and outputting, to an operating device for the control valve, as an amplified pneumatic pressure signal; and
   a positioner operating mode identifier identifying automatically whether an operating mode of the positioner is in a positive operating mode wherein the greater the control output the greater the amplified pneumatic pressure signal, or a negative operating mode wherein the greater the control output the less the amplified pneumatic pressure signal.

2. The positioner as set forth in claim 1, wherein:
   the positioner operating mode identifier monitors changes in the control output and changes in the amplified pneumatic pressure signal corresponding to the changes in the control output; and,
   when a positive direction refers to a direction of change wherein the control output and the amplified pneumatic pressure signal change to be greater, respectively, and when a negative direction refers to a direction of change wherein the control output and the amplified pneumatic pressure signal change to be less, respectively,
   the positioner operating mode identifier identifies the operating mode of the positioner as the positive operating mode when the direction of change of the control output is the positive direction and the direction of change of the amplified pneumatic pressure signal is the positive direction or when the direction of change of the control output is the negative direction and the direction of change of the amplified pneumatic pressure signal is the negative direction, and
   the positioner operating mode identifier alternately identifies the operating mode of the positioner as the negative operating mode when the direction of change of the control output is the positive direction and the direction of change of the amplified pneumatic pressure signal is the negative direction or when the direction of change of the control output is the negative direction and the direction of change of the amplified pneumatic pressure signal is the positive direction.

3. The positioner as set forth in claim 1, wherein:
   the positioner operating mode identifier comprises:
      an electro-pneumatic converter operating mode identifier identifying an operating mode of the electro-pneumatic converter;
      a pneumatic pressure signal amplifier operating mode identifier identifying an operating mode of the pneumatic pressure signal amplifier; and
      a positioner operating mode determiner determining the operating mode of the positioner from an identification result of the operating mode of the electro-pneumatic converter and an identification result of the operating mode of the pneumatic pressure signal amplifier.

4. The positioner as set forth in claim 3, wherein:
   the electro-pneumatic converter operating mode identifier monitors changes in the control output, and changes in the pneumatic pressure signal corresponding to the changes in the control output;
   when a positive direction refers to a direction of change wherein the control output and the pneumatic pressure signal change to be greater, respectively, and when a negative direction refers to a direction of change wherein the control output and the pneumatic pressure signal change to be less, respectively,
   the electro-pneumatic converter operating mode identifier identifies the operating mode of the electro-pneumatic converter as the positive operating mode when the direction of change of the control output is the positive direction and the direction of change of the pneumatic pressure signal is the positive direction or when the direction of change of the control output is the negative direction and the direction of change of the pneumatic pressure signal is the negative direction, and
   the electro-pneumatic converter operating mode identifier alternately identifies the operating mode of the electro-pneumatic converter as the negative operating mode when the direction of change of the control output is the positive direction and the direction of change of the pneumatic pressure signal is the negative direction or when the direction of change of the control output is the negative direction and the direction of change of the pneumatic pressure signal is the positive direction;
   the pneumatic pressure signal amplifier operating mode identifier monitors changes in the pneumatic pressure signal, and changes in the amplified pneumatic pressure signal corresponding to the changes in the pneumatic pressure signal; and
   when a positive direction refers to a direction of change wherein the pneumatic pressure signal and the amplified pneumatic pressure signal change to be greater, respectively, and when a negative direction refers to a direction of change wherein the pneumatic pressure signal and the amplified pneumatic pressure signal change to be less, respectively,
   the pneumatic pressure signal amplifier operating mode identifier identifies the operating mode of the pneumatic pressure signal amplifier as the positive operating mode when the direction of change of the pneumatic pressure signal is the positive direction and the direction of change of the amplified pneumatic pressure signal is the positive direction or when the direction of change of the pneumatic pressure signal is the negative direction and the direction of change of the amplified pneumatic pressure signal is the negative direction, and the pneumatic pressure signal amplifier operating mode identifier alternately identifies the operating mode of the pneumatic pressure signal amplifier as the negative operating mode when the direction of change of the pneumatic pressure signal is the positive direction and the direction of change of the amplified pneumatic pressure signal is the negative direction or when the direction of change of the pneumatic pressure signal is the negative direction and the direction of change of the amplified pneumatic pressure signal is the positive direction.

5. The positioner as set forth in claim 1, comprising a positioner operating mode reporter reporting the positioner operating mode identified through the positioner operating mode identifier.

* * * * *